US008431510B2

(12) United States Patent
Gabrielov et al.

(10) Patent No.: US 8,431,510 B2
(45) Date of Patent: *Apr. 30, 2013

(54) COMPOSITION USEFUL IN THE CATALYTIC HYDROPROCESSING OF HYDROCARBON FEEDSTOCKS, A METHOD OF MAKING SUCH CATALYST, AND A PROCESS OF USING SUCH CATALYST

(75) Inventors: Alexei Grigorievich Gabrielov, Houston, TX (US); John Anthony Smegal, Houston, TX (US); Salvatore Philip Torrisi, The Woodlands, TX (US)

(73) Assignee: Shell Oil Company, Houston, TX (US)

( * ) Notice: Subject to any disclaimer, the term of this patent is extended or adjusted under 35 U.S.C. 154(b) by 858 days.

This patent is subject to a terminal disclaimer.

(21) Appl. No.: 12/185,209

(22) Filed: Aug. 4, 2008

(65) Prior Publication Data
US 2009/0038993 A1 Feb. 12, 2009

Related U.S. Application Data

(60) Provisional application No. 60/954,267, filed on Aug. 6, 2007.

(51) Int. Cl.
*B01J 31/26* (2006.01)
*C10G 45/04* (2006.01)

(52) U.S. Cl.
USPC ........... 502/150; 502/219; 502/220; 502/221; 502/222; 502/305; 502/315; 502/321; 502/325; 502/337; 208/213; 208/216 R; 208/217

(58) Field of Classification Search .................. 502/150, 502/168, 337, 216, 219–222, 305, 308, 315, 502/321, 325–326; 208/209, 213, 216 R, 208/217

See application file for complete search history.

(56) References Cited

U.S. PATENT DOCUMENTS

| 5,338,717 | A | 8/1994 | Aldridge et al. | 520/211 |
| 6,329,314 | B1 | 12/2001 | Mignard et al. | 502/222 |
| 6,509,291 | B2 | 1/2003 | Eijsbouts | 502/216 |
| 6,872,678 | B2 | 3/2005 | Eijsbouts | 502/29 |
| 7,297,252 | B2 | 11/2007 | McKnight et al. | 208/213 |
| 2002/0000394 | A1 | 1/2002 | Eijsbouts | 208/209 |
| 2004/0154960 | A1 | 8/2004 | McKnight et al. | 208/213 |

OTHER PUBLICATIONS

Ryabov, V.D. and O.B. Chernova, "Quantitative Determination of Olefins in Petroleum Products", Chemistry and Technology of Fuels and Oils, vol. 35, No. 2, 1999, pp. 107-108.*
Boduxzynski, M.M. et al., "Molecular Weight Distributions in Heavy Crudes", 1998.*

* cited by examiner

*Primary Examiner* — Prem C Singh
*Assistant Examiner* — Renee E Robinson
(74) *Attorney, Agent, or Firm* — Charles W. Stewart

(57) ABSTRACT

A hydrocarbon oil-impregnated composition that comprises a support material having incorporated therein a metal component and impregnated with a hydrocarbon oil. The hydrocarbon oil-impregnated composition is useful in the hydrotreating of hydrocarbon feedstocks, and it is especially useful in applications involving delayed feed introduction whereby the hydrocarbon oil-impregnated composition is first treated with hot hydrogen, and, optionally, a sulfur compound, prior to contacting it with a hydrocarbon feedstock under hydrodesulfurization process conditions.

26 Claims, 1 Drawing Sheet

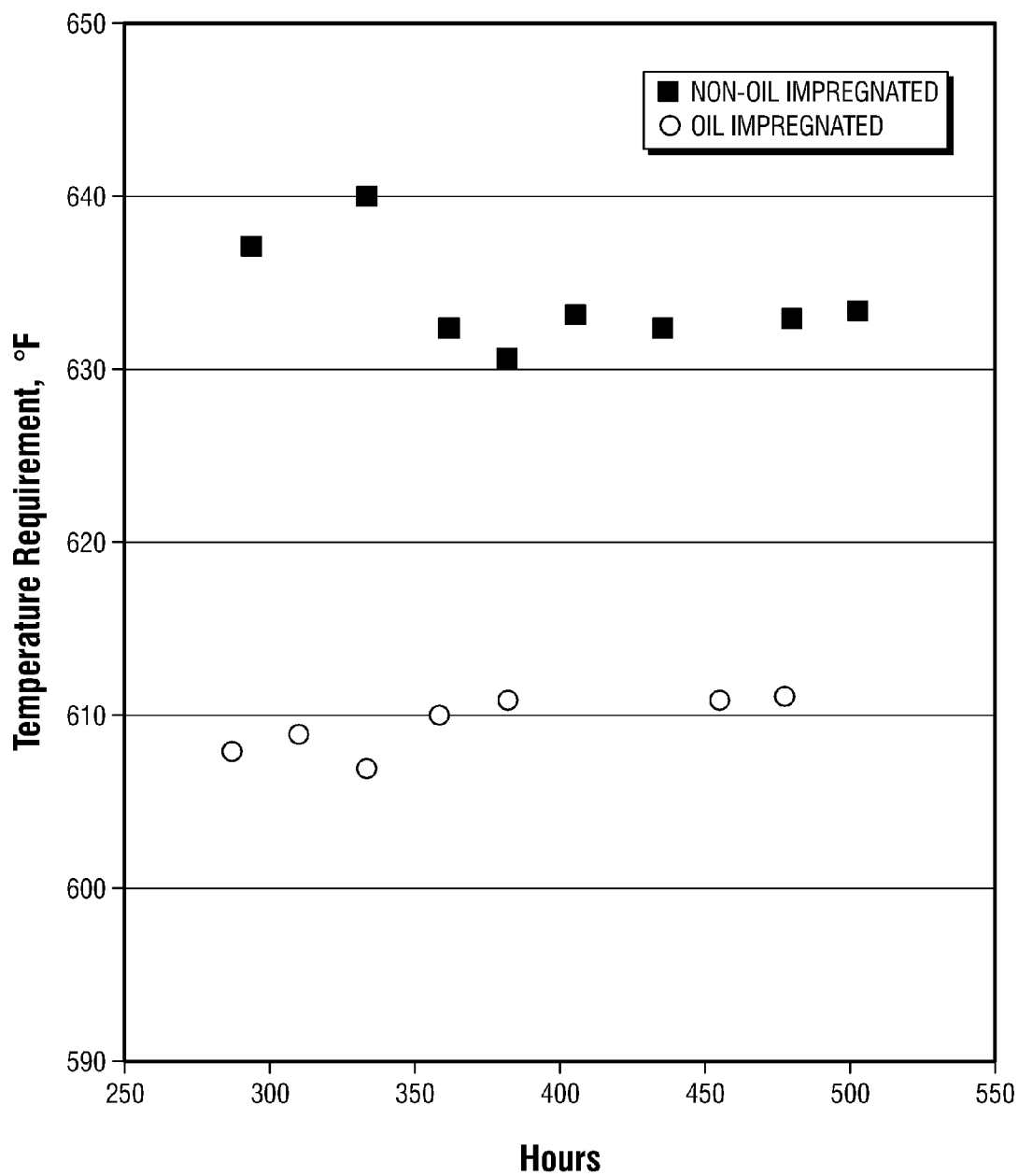

COMPOSITION USEFUL IN THE CATALYTIC HYDROPROCESSING OF HYDROCARBON FEEDSTOCKS, A METHOD OF MAKING SUCH CATALYST, AND A PROCESS OF USING SUCH CATALYST

This application claims the benefit of U.S. Provisional Application No. 60/954,267 filed Aug. 6, 2007, the entire disclosure of which is hereby incorporated by reference.

This invention relates to an oil-impregnated composition, a method of making such a composition, and its use in the catalytic hydroprocessing of hydrocarbon feedstocks.

As a result of the recently reduced requirements on the sulfur concentration limits for diesel fuels, there has been a great effort by those in industry to find new hydrotreating catalyst formulations and products that may be used in the manufacture of low-sulfur diesel and other products. One catalyst taught by the art for use in the hydrotreating of certain hydrocarbon feedstocks so as to meet some of the more stringent sulfur regulations is disclosed in U.S. Pat. No. 5,338,717. In this patent, a hydrotreating catalyst is disclosed that is made by impregnating a Group VI (Mo and/or W) heteropolyacid onto a support followed by treating the impregnated support with an aqueous solution of a reducing agent that may be dried and thereafter impregnated with a Group VIII (Co and/or Ni) metal salt of an acid having an acidity of less than that of the Group VI heteropolyacid. This impregnated support is then dried and sulfided to provide a final catalyst. The catalyst composition disclosed in the '717 patent may also be made by impregnating a support with both the Group VIII metal salt and the Group VI heteropolyacid followed by drying and then treating with a reducing agent, drying again, and sulfiding to form the final catalyst.

Another catalyst useful in the deep hydrodesulfurization and other methods of hydrotreating hydrocarbon feedstocks and a method of making such catalyst and its activation are disclosed in U.S. Pat. No. 6,872,678. The catalyst of the '678 patent includes a carrier upon which a Group VIB hydrogenation metal component and/or a Group VIII hydrogenation metal component and a sulfur-containing organic compound additive are incorporated and further which has been contacted with a petroleum fraction organic liquid. The catalyst is treated with hydrogen either simultaneously with or after the incorporation of the organic liquid (petroleum fraction).

In U.S. Pat. No. 6,509,291 is disclosed a catalyst and a process for sulfiding a catalyst composition that comprises a hydrogenation metal component of either a Group VI metal or a Group VIII metal, or both, and a sulfur-containing organic additive and which has first been contacted with an organic liquid (petroleum fraction) before being sulfided. The organic liquid ensures that the catalyst is able to withstand the treatment conditions prevailing during the actual sulfidation step. The sulfidation is done by contacting the additive-containing catalyst that has first been contacted with the organic liquid with gaseous hydrogen and a sulfur-containing compound that is either $H_2S$ and/or a compound that is decomposable into $H_2S$ to provide the sulfided catalyst.

U.S. Pat. No. 6,329,314 discloses a process for the activation of a hydroconversion catalyst that contains a Group VIII metal component and optionally a Group VI metal component by impregnating the catalyst with liquid phase petroleum fraction, a thionic compound and a nitrogenous compound under certain specified conditions.

Many of the prior art hydrotreating catalysts contain additives in order to impart certain beneficial properties, and they often will have incorporated into them hydrocarbon oil prior to their activation by contacting with a sulfur compound.

There is an ongoing need to find improved higher activity hydrotreating catalysts, and it can be particularly advantageous to find hydrotreating catalysts that do not require the use of the aforementioned additives in order to provide enhanced catalytic properties. There is also a need to find more economical manufacturing methods and improved methods of activating hydrotreating catalysts so as to provide catalysts having better activity than catalysts activated by alternative methods.

Accordingly, provided is a composition that comprises a support material containing a metal component of a metal salt solution and hydrocarbon oil. Another embodiment of the inventive composition comprises a support material that is loaded with an active metal precursor and hydrocarbon oil, wherein said support is thereafter treated with hydrogen. And yet, another embodiment of the inventive composition comprises a dried metal-impregnated support material, wherein said dried metal-impregnated support material has a volatiles content in the range of from 3 to 20 wt. % LOI, and wherein into said dried metal-impregnated support material is impregnated with hydrocarbon oil.

The aforedescribed inventive compositions may be made by one of several embodiments of the inventive method with one such embodiment comprising incorporating a metal-containing solution into a support material to provide a metal-incorporated support material; and incorporating hydrocarbon oil into said metal-incorporated support material to provide an oil-incorporated composition. Another embodiment of the inventive method comprises impregnating a support material with a metal-containing solution to provide a metal-impregnated support material; drying said metal-impregnated support material to remove therefrom at least a portion of volatiles contained in said metal-impregnated support material so as to provide a dried metal-impregnated support material having a volatiles content in the range of from 3 to 20 wt. % LOI; and incorporating hydrocarbon oil into said dried metal-impregnated support material so as to fill a significant portion of its pore volume with said hydrocarbon oil to provide an oil-impregnated composition.

FIG. 1 presents two plots of the weighted average bed temperature (WABT) required for the hydrodesulfurization of a distillate feedstock to yield a low sulfur distillate product having a 10 ppmw sulfur concentration with one plot representing the result of using the hydrocarbon oil-impregnated composition of the invention after its hydrogen treatment and sulfiding, and the other plot representing the result of using a similar composition to that of the hydrocarbon oil-impregnated composition, but which was not impregnated with hydrocarbon oil, after its hydrogen treatment and sulfiding.

The composition of the invention is one which is particularly useful in the catalytic hydroprocessing of petroleum or other hydrocarbon feedstocks, or the composition of the invention is one which is convertible by the treatment with hydrogen or a sulfur compound, or both, into a catalyst composition having particularly good catalytic properties in the hydroprocessing of hydrocarbon feedstocks. It is a significant aspect of the inventive composition that the use of many of the typical prior art additives is not required in order to provide certain catalytic properties including a suitably high activity. Another beneficial feature of the invention is that the composition does not need to be calcined or to have sulfur added to it prior to its placement into a reactor vessel or within a reactor system for use in the hydrodesulfurization of a hydrocarbon feedstock. This feature provides the particular benefit of significantly reducing certain costs that are associated with manufacturing and treatment of the composition, and it allows for the use of in situ activation methods that yield a catalyst composition which exhibits significantly improved hydrodesulfurization catalytic activity over certain other hydrodesulfurization catalyst compositions. The composition of the invention further allows for an improved procedure in the start-up of hydrodesulfurization reactor systems.

The composition of the invention includes a support material that has incorporated therein or is loaded with a metal component, which is or can be converted to a metal compound that has activity towards the catalytic hydrogenation of organic sulfur compounds or, otherwise, has application in the hydrodesulfurization of hydrocarbon feedstocks. This support material that contains the metal component further has incorporated therein hydrocarbon oil to thereby provide the hydrocarbon oil-impregnated composition of the invention.

The support material of the inventive composition can comprise any suitable inorganic oxide material that is typically used to carry catalytically active metal components. Examples of possible useful inorganic oxide materials include alumina, silica, silica-alumina, magnesia, zirconia, boria, titania and mixtures of any two or more of such inorganic oxides. The preferred inorganic oxides for use in the formation of the support material are alumina, silica, silica-alumina and mixtures thereof. Most preferred, however, is alumina.

In the preparation of various embodiments of the inventive composition, the metal component of the composition may be incorporated into the support material by any suitable method or means that provides the support material that is loaded with an active metal precursor, thus, the composition includes the support material and a metal component. One method of incorporating the metal component into the support material, includes, for example, co-mulling the support material with the active metal or metal precursor to yield a co-mulled mixture of the two components. Or, another method includes the co-precipitation of the support material and metal component to form a co-precipitated mixture of the support material and metal component. Or, in a preferred method, the support material is impregnated with the metal component using any of the known impregnation methods such as incipient wetness to incorporate the metal component into the support material.

When using the impregnation method to incorporate the metal component into the support material, it is preferred for the support material to be formed into a shaped particle comprising an inorganic oxide material and thereafter loaded with an active metal precursor, preferably, by the impregnation of the shaped particle with an aqueous solution of a metal salt to give the support material containing a metal of a metal salt solution. To form the shaped particle, the inorganic oxide material, which preferably is in powder form, is mixed with water and, if desired or needed, a peptizing agent and/or a binder to form a mixture that can be shaped into an agglomerate. It is desirable for the mixture to be in the form of an extrudable paste suitable for extrusion into extrudate particles, which may be of various shapes such as cylinders, trilobes, etc and nominal sizes such as 1/16", 1/8", 3/1", etc. The support material of the inventive composition, thus, preferably, is a shaped particle comprising an inorganic oxide material.

The shaped particle is then dried under standard drying conditions that can include a drying temperature in the range of from 50° C. to 200° C., preferably, from 75° C. to 175° C., and, most preferably, from 90° C. to 150° C. After drying, the shaped particle is calcined under standard calcination conditions that can include a calcination temperature in the range of from 250° C. to 900° C., preferably, from 300° C. to 800° C., and, most preferably, from 350° C. to 600° C.

The calcined shaped particle can have a surface area (determined by the BET method employing $N_2$, ASTM test method D 3037) that is in the range of from 50 $m^2/g$ to 450 $m^2/g$, preferably from 75 $m^2/g$ to 400 $m^2/g$, and, most preferably, from 100 $m^2/g$ to 350 $m^2/g$. The mean pore diameter in angstroms (Å) of the calcined shaped particle is in the range of from 50 to 200, preferably, from 70 to 150, and, most preferably, from 75 to 125. The pore volume of the calcined shaped particle is in the range of from 0.5 cc/g to 1.1 cc/g, preferably, from 0.6 cc/g to 1.0 cc/g, and, most preferably, from 0.7 to 0.9 cc/g. Less than ten percent (10%) of the total pore volume of the calcined shaped particle is contained in the pores having a pore diameter greater than 350 Å, preferably, less than 7.5% of the total pore volume of the calcined shaped particle is contained in the pores having a pore diameter greater than 350 Å, and, most preferably, less than 5%.

The references herein to the pore size distribution and pore volume of the calcined shaped particle are to those properties as determined by mercury intrusion porosimetry, ASTM test method D 4284. The measurement of the pore size distribution of the calcined shaped particle is by any suitable measurement instrument using a contact angle of 140° with a mercury surface tension of 474 dyne/cm at 25° C.

In a preferred embodiment of the invention, the calcined shaped particle is impregnated in one or more impregnation steps with a metal component using one or more aqueous solutions containing at least one metal salt wherein the metal compound of the metal solution is an active metal or active metal precursor. The metal elements are those selected from Group 6 of the IUPAC Periodic Table of the elements (e.g., chromium (Cr), molybdenum (Mo), and tungsten (W)) and Groups 9 and 10 of the IUPAC Periodic Table of the Elements (e.g., cobalt (Co) and nickel (Ni)). Phosphorous (P) is also a desired metal component. For the Group 9 and 10 metals, the metal salts include Group 9 or 10 metal acetates, formats, citrates, oxides, hydroxides, carbonates, nitrates, sulfates, and two or more thereof. The preferred metal salts are metal nitrates, for example, such as nitrates of nickel or cobalt, or both. For the Group 6 metals, the metal salts include Group 6 metal oxides or sulfides. Preferred are salts containing the Group 6 metal and ammonium ion, such as ammonium heptamolybdate and ammonium dimolybdate. The concentration of the metal compounds in the impregnation solution is selected so as to provide the desired metal content in the final composition of the invention taking into consideration the pore volume of the support material into which the aqueous solution is to be impregnated and the amount of hydrocarbon oil to be incorporated into the support material that is loaded with a metal component. Typically, the concentration of metal compound in the impregnation solution is in the range of from 0.01 to 100 moles per liter.

The metal content of the support material having a metal component incorporated therein may depend upon the application for which the hydrocarbon oil-impregnated composition of the invention is to be used, but, generally, for hydroprocessing applications, the Group 9 and 10 metal component, i.e., cobalt or nickel, preferably, nickel, can be present in the support material having a metal component incorporated therein in an amount in the range of from 0.5 wt. % to 20 wt. %, preferably from 1 wt. % to 15 wt. %, and, most preferably, from 2 wt. % to 12 wt. %; and the Group 6 metal component, i.e., molybdenum or tungsten, preferably, molybdenum, can be present in the support material having a metal component incorporated therein in an amount in the range of from 5 wt. % to 50 wt. %, preferably from 8 wt. % to 40 wt. %, and, most preferably, from 12 wt. % to 30 wt. %. The above-referenced weight percents for the metal components are based on the dry support material and the metal component as the element regardless of the actual form of the metal component.

To provide the hydrocarbon oil-impregnated composition of the invention, a suitable hydrocarbon oil is incorporated into the support material that also has incorporated therein, as described above, the active metal precursor. The hydrocarbon oil is used to fill a significant portion of the pore volume of the pores of the support material, which is already loaded with the active metal precursor, to thereby provide a composition that comprises a support material containing a metal component and hydrocarbon oil, that may be installed, as is, into a reactor vessel or within a reactor system that is to undergo a start-up procedure in preparation of or prior to the introduction of a sulfiding feed that can include a sulfiding agent or a hydrocarbon feedstock containing a concentration of an organic sulfur compound.

It is a significant aspect of the invention that the support material loaded with an active metal precursor is not calcined or sulfided prior to its loading into a reactor vessel or system for ultimate use as a hydrodesulfurization catalyst but that it can be sulfided, in situ, in a delayed feed introduction start-up procedure, as hereinafter more fully described. Moreover, it has been determined that an improvement in catalytic activity is obtainable when, prior to hydrogen treatment and sulfiding, the support material loaded with the active metal precursor is filled with hydrocarbon oil. Thus, not only are certain economic benefits realized by eliminating, or at least not incurring, the costs associated with calcination and sulfidation of the catalyst prior to its delivery and use, but also a more active catalyst is obtained.

It has been found that the support material, loaded with an active metal precursor, that has been impregnated with a hydrocarbon oil followed by treatment with hydrogen and, thereafter, with a sulfur compound provides a hydrotreating catalyst having a greater hydrodesulfurization activity than the support material, loaded with an active metal precursor, but which has not been impregnated with a hydrocarbon oil prior to hydrogen treatment followed by sulfur treatment. While the reason for this improvement in activity is not known with certainty, it is theorized that the presence of the hydrocarbon oil during the heating-up of the hydrocarbon oil-impregnated composition in the presence of hydrogen gas protects the active catalyst sites from reacting with the hydrogen thereby preventing active phase degradation and sintering that cause activity loss.

The hydrocarbon oil used to fill the pores of the support material loaded with an active metal precursor can be any suitable hydrocarbon compound or mixture of compounds that provides for the benefits as described herein. Because the hydrogen treatment of the support material that is loaded with an active metal precursor and which is filled or impregnated with the hydrocarbon oil includes exposure thereof to a gaseous atmosphere containing hydrogen at a temperature ranging upwardly to 250° C., to obtain the maximum benefit from the impregnation with the hydrocarbon oil, its boiling temperature should be such that it predominantly remains in the liquid phase at the contacting temperature of the hydrogen-containing gaseous atmosphere during treatment therewith. In terms of boiling temperature range, the hydrocarbon oil generally should includes hydrocarbons having a boiling temperature in the range of from 100° C. to 550° C. and, preferably, from 150° C. to 500° C. Possible suitable hydrocarbon oils for impregnation or incorporation into the support material loaded with an active metal precursor can include crude oil distillate fractions, such as, for example, heavy naphtha, containing hydrocarbons boiling, perhaps, in the range of from 100° C. to 210° C., kerosene, diesel, and gas oil. Among these distillate fractions, diesel is the preferred hydrocarbon oil, which typically includes hydrocarbons having a boiling temperature in the range of from 170° C. to 350° C.

The hydrocarbon oils that are particularly suitable for use in filling the pores of the support material containing a metal component include olefin compounds that are liquid at the elevated contacting temperature of the hydrogen-containing gaseous atmosphere during treatment therewith. The desirable olefins for use as the hydrocarbon oil or a portion thereof are those olefin compounds having a carbon number greater than 12 and, generally, having a carbon number in the range of from 12 to 40 carbons. It is preferred for the olefin compounds for use as the hydrocarbon oil to be those having from 14 to 38 carbons, and, most preferably, the carbon number is in the range of from 16 to 36 carbons. The olefins may be in an admixture with non-olefinic hydrocarbons, such as alkanes or aromatic solvents or any of the above-referenced petroleum distillate fractions, such as, heavy naphtha, kerosene, diesel, and gas oil. In general, the olefin content of any hydrocarbon oil having an olefin content is above 5 wt. %, and, in certain instances, it can be desirable for the hydrocarbon oil to have an olefin content exceeding 10 wt. %, and even exceeding 30 wt. %. The olefin compounds may include monoolefins or they may include olefins with multiple carbon double bonds. Particularly desirable olefins for use as the hydrocarbon oil of the invention are alpha-olefins, which are monoolefins with the carbon double bound being located at the alpha carbon of the carbon chain of the olefin compound. An especially preferred hydrocarbon oil is a mixture of alpha olefin hydrocarbon molecules that have from 18 to 30 carbon atoms per molecule.

A particularly important aspect of the invention is for the support material having a metal component incorporated therein to be uncalcined and non-sulfided when it is impregnated with the hydrocarbon oil. Cost savings in the preparation of the composition are realized by not having to perform the calcination or sulfidation steps. But, moreover, it has been found that, when the hydrocarbon oil-impregnated composition is further subjected to a hydrogen treatment and sulfur treatment, the resulting catalyst composition exhibits enhanced catalytic activity. Before the incorporation of the hydrocarbon oil into the support material having a metal component incorporated therein, particularly when the metal component is added to the support material by impregnation using an aqueous solution of a metal salt (metal-impregnated support material), it is important for this metal-impregnated support material to be dried so as to remove at least a portion of the volatile liquid contained within the pores of the support material so as to provide pore volume that can be filled with the hydrocarbon oil. The metal-impregnated support material, thus, is dried under drying conditions that include a drying temperature that is less than a calcination temperature.

It is an important feature of the invention that the drying temperature under which the drying step is conducted does not to exceed a calcination temperature. Thus, the drying temperature should not exceed 400° C., and, preferably, the drying temperature at which the metal-impregnated support material is dried does not exceed 300° C., and, most preferably, the drying temperature does not exceed 250° C. It is understood that the drying step will, in general, be conducted at lower temperatures than the aforementioned temperatures, and, typically, the drying temperature will be conducted at a temperature in the range of from 60° C. to 150° C.

The drying of the metal-impregnated support material is preferably controlled in a manner so as to provide the resulting dried metal-impregnated support material having a volatiles content that is in particular range. The volatiles content of the dried metal-impregnated support material should be controlled so that it does not exceed 20 wt. % LOI. The LOI, or loss on ignition, is defined as the percentage weight loss of the material after its exposure to air at a temperature of 482° C. for a period of two hours, which can be represented by the following formula: (sample weight before exposure less sample weight after exposure) multiplied by 100 and divided by (sample weight before exposure). It is preferred for the LOI of the dried metal-impregnated support material to be in the range of from 1 wt. % to 20 wt. %, and, most preferred, from 3 wt.% to 15 wt. %. The dried metal-impregnated support material is further impregnated with the hydrocarbon oil as earlier described herein.

The hydrocarbon oil-impregnated composition of the invention may be treated, either ex situ or in situ, with hydrogen and with a sulfur compound, and, indeed, it is one of the beneficial features of the invention that it permits the shipping and delivery of a non-sulfurized composition to a reactor in which it can be activated, in situ, by a hydrogen treatment step followed by a sulfurization step. As earlier mentioned, the hydrocarbon oil-impregnated composition can first undergo a hydrogen treatment that is then followed with treatment with a sulfur compound.

The hydrogen treatment includes exposing the hydrocarbon oil-impregnated composition to a gaseous atmosphere containing hydrogen at a temperature ranging upwardly to 250° C. Preferably, the hydrocarbon oil-impregnated composition is exposed to the hydrogen gas at a hydrogen treatment temperature in the range of from 100° C. to 225° C., and, most preferably, the hydrogen treatment temperature is in the range of from 125° C. to 200° C.

The partial pressure of the hydrogen of the gaseous atmosphere used in the hydrogen treatment step generally can be in the range of from 1 bar to 70 bar, preferably, from 1.5 bar to 55 bar, and, most preferably, from 2 bar to 35 bar. The hydrocarbon oil-impregnated composition is contacted with the gaseous atmosphere at the aforementioned temperature and pressure conditions for a hydrogen treatment time period in the range of from 0.1 hours to 100 hours, and, preferably, the hydrogen treatment time period is from 1 hour to 50 hours, and most preferably, from 2 hours to 30 hours.

Sulfiding of the hydrocarbon oil-impregnated composition after it has been treated with hydrogen can be done using any conventional method known to those skilled in the art. Thus, the hydrogen treated hydrocarbon oil-impregnated composition can be contacted with a sulfur-containing compound, which can be hydrogen sulfide or a compound that is decomposable into hydrogen sulfide, under the contacting conditions of the invention. Examples of such decomposable compounds include mercaptans, $CS_2$, thiophenes, dimethyl sulfide (DMS), and dimethyl disulfide (DMDS). Also, preferably, the sulfiding is accomplished by contacting the hydrogen treated composition, under suitable sulfurization treatment conditions, with a hydrocarbon feedstock that contains a concentration of a sulfur compound. The sulfur compound of the hydrocarbon feedstock can be an organic sulfur compound, particularly, one which is typically contained in petroleum distillates that are processed by hydrodesulfurization methods.

Suitable sulfurization treatment conditions are those which provide for the conversion of the active metal components of the hydrogen treated hydrocarbon oil-impregnated composition to their sulfided form. Typically, the sulfiding temperature at which the hydrogen treated hydrocarbon oil-impregnated composition is contacted with the sulfur compound is in the range of from 150° C. to 450° C., preferably, from 175° C. to 425° C., and, most preferably, from 200° C. to 400° C. When using a hydrocarbon feedstock that is to be hydrotreated using the catalyst composition of the invention to sulfide the hydrogen treated composition, the sulfurization conditions can be the same as the process conditions under which the hydrotreating is performed. The sulfiding pressure at which the hydrogen treated hydrocarbon oil-impregnated composition is sulfided generally can be in the range of from 1 bar to 70 bar, preferably, from 1.5 bar to 55 bar, and, most preferably, from 2 bar to 35 bar.

As noted above, one of the benefits provided by the hydrocarbon oil-impregnated composition of the invention is that it can be utilized in a reactor system that is started up using a so-called delayed feed introduction procedure. In the delayed feed introduction procedure, the reactor system, which includes a reactor vessel containing the hydrocarbon oil-impregnated composition, first undergoes a heating step to raise the temperature of the reactor and the hydrocarbon oil-impregnated composition contained therein in preparation for the introduction of a sulfiding agent or heated hydrocarbon feedstock for processing. This heating step includes introducing into the reactor the hydrogen-containing gas at the aforementioned hydrogen treatment conditions. After the hydrogen treatment of the hydrocarbon oil-impregnated composition, it is thereafter treated with a sulfur compound in the manner as earlier described herein.

It has been found that the hydrocarbon oil-containing composition, after undergoing the hydrogen treatment followed by treatment with a sulfur compound, exhibits a greater catalytic activity toward hydrodesulfurization of a distillate feedstock than do other similar, but non-oil impregnated, compositions. As discussed earlier herein, it is theorized that the presence of the hydrocarbon oil contained in the pores of the support material having incorporated therein a metal component serves to protect the active catalytic sites from contact and reaction with hydrogen during the hydrogen treatment and thereby preventing degradation and sintering that cause activity loss.

It is recognized that the hydrocarbon oil-impregnated composition of the invention, after its treatment with hydrogen and sulfur, is a highly effective catalyst for use in the hydrotreating of hydrocarbon feedstocks. This catalyst is particularly useful in applications involving the hydrodesulfurization of hydrocarbon feedstocks, and, especially, it has been found to be an excellent catalyst for use in the hydrodesulfurization of distillate feedstocks, in particular, diesel, to make an ultra-low sulfur distillate product having a sulfur concentration of less than 15 ppmw, preferably, less than 10 ppmw, and, most preferably, less than 8 ppmw.

In the hydrotreating applications, the hydrocarbon oil-impregnated composition, preferably used in a delayed feed introduction procedure or otherwise treated with hydrogen and sulfur, as described above, is contacted under suitable hydrodesulfurization conditions with a hydrocarbon feedstock that typically has a concentration of sulfur. The more typical and preferred hydrocarbon feedstock is a petroleum middle distillate cut having a boiling temperature at atmospheric pressure in the range of from 140° C. to 410° C. These temperatures are approximate initial and boiling temperatures of the middle distillate. Examples of refinery streams intended to be included within the meaning of middle distillate include straight run distillate fuels boiling in the referenced boiling range, such as, kerosene, jet fuel, light diesel oil, heating oil, heavy diesel oil, and the cracked distillates, such as FCC cycle oil, coker gas oil, and hydrocracker distillates. The preferred feedstock of the inventive distillate hydrodesulfurization process is a middle distillate boiling in the diesel boiling range of from about 140° C. to 400° C.

The sulfur concentration of the middle distillate feedstock can be a high concentration, for instance, being in the range upwardly to about 2 weight percent of the distillate feedstock based on the weight of elemental sulfur and the total weight of the distillate feedstock inclusive of the sulfur compounds. Typically, however, the distillate feedstock of the inventive process has a sulfur concentration in the range of from 0.01 wt. % (100 ppmw) to 1.8 wt. % (18,000). But, more typically, the sulfur concentration is in the range of from 0.1 wt. % (1000 ppmw) to 1.6 wt. % (16,000 ppmw), and, most typically, from 0.18 wt. % (1800 ppmw) to 1.1 wt. % (11,000 ppmw). It is understood that the references herein to the sulfur content of the distillate feedstock are to those compounds that are normally found in a distillate feedstock or in the hydrodesulfurized distillate product and are chemical compounds that contain a sulfur atom and which generally include organosulfur compounds.

The hydrocarbon oil-impregnated composition of the invention may be employed as a part of any suitable reactor system that provides for contacting it or its derivatives with the distillate feedstock under suitable hydrodesulfurization conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the distillate feedstock into the reactor vessel, and a reactor effluent outlet means, such as an effluent outlet nozzle, for withdrawing the reactor effluent or the treated hydrocarbon product or the ultra-low sulfur distillate product from the reactor vessel.

The hydrodesulfurization process generally operates at a hydrodesulfurization reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

The hydrodesulfurization reaction temperature is generally in the range of from 200° C. (392° F.) to 420° C. (788° F.), preferably, from 260° C. (500° F.) to 400° C. (752° F.), and, most preferably, from 320° C. (608° F.) to 380° C. (716° F.). It is recognized that one of the unexpected features of the use of the inventive hydrocarbon oil-impregnated composition of the invention is that, in a delayed feed introduction application, the resultant catalyst has a significantly higher catalytic activity than certain other alternative catalyst compositions, and, thus, it will, in general, provide for comparatively lower required process temperatures for a given amount of desulfurization.

The flow rate at which the distillate feedstock is charged to the reaction zone of the inventive process is generally such as to provide a liquid hourly space velocity (LHSV) in the range of from 0.01 hr$^{-1}$ to 10 hr$^{-1}$. The term "liquid hourly space velocity", as used herein, means the numerical ratio of the rate at which the distillate feedstock is charged to the reaction zone of the inventive process in volume per hour divided by the volume of catalyst contained in the reaction zone to which the distillate feedstock is charged. The preferred LHSV is in the range of from 0.05 hr$^{-1}$ to 5 hr$^{-1}$, more preferably, from 0.1 hr$^{-1}$ to 3 hr$^{-1}$. and, most preferably, from 0.2 hr$^{-1}$ to 2 hr$^{-1}$.

It is preferred to charge hydrogen along with the distillate feedstock to the reaction zone of the inventive process. In this instance, the hydrogen is sometimes referred to as hydrogen treat gas. The hydrogen treat gas rate is the amount of hydrogen relative to the amount of distillate feedstock charged to the reaction zone and generally is in the range upwardly to 1781 m$^3$/m$^3$ (10,000 SCF/bbl). It is preferred for the treat gas rate to be in the range of from 89 m$^3$/m$^3$ (500 SCF/bbl) to 1781 m$^3$/m$^3$ (10,000 SCF/bbl), more preferably, from 178 m$^3$/m$^3$ (1,000 SCF/bbl) to 1602 m$^3$/m$^3$ (9,000 SCF/bbl), and, most preferably, from 356 m$^3$/m$^3$ (2,000 SCF/bbl) to 1425 m$^3$/m$^3$ (8,000 SCF/bbl).

The desulfurized distillate product yielded from the process of the invention has a low or reduced sulfur concentration relative to the distillate feedstock. A particularly advantageous aspect of the inventive process is that it is capable of providing a deeply desulfurized diesel product or an ultra-low sulfur diesel product. As already noted herein, the low sulfur distillate product can have a sulfur concentration that is less than 50 ppmw or any of the other noted sulfur concentrations as described elsewhere herein (e.g., less than 15 ppmw, or less than 10 ppmw, or less than 8 ppmw).

The following examples are presented to further illustrate certain aspects of the invention, but they are not to be construed as limiting the scope of the invention.

EXAMPLE 1

This example describes the preparation of the hydrocarbon oil-impregnated composition of the invention and the non-oil impregnated composition.

Non-Oil Impregnated Composition

An amount of dried and calcined standard alumina 1.3 mm trilobe extrudate was impregnated with a nickel/molybdenum/phosphorous containing impregnation solution. This impregnation solution was an aqueous solution made by dissolving nickel oxide (NiO), molybdenum trioxide (MoO$_3$) and phosphoric acid in de-ionized water with heating and stirring. A volume of the impregnation solution was used to fill the pores of the extrudate so as to load it with 4.2 wt % nickel, 18.5 wt % molybdenum, and 3.3 wt % phosphorous, with the weight percents being on a dry basis. The impregnated extrudate was allowed to age for two hours, and, then, it was dried in air at 100° C. to reduce the volatiles therein to a content of 7.3 wt % to provide the non-oil impregnated composition.

Hydrocarbon Oil-Impregnated Composition

The hydrocarbon oil-impregnated composition was made by impregnating an amount of the non-oil impregnated composition, as described above, with a volume of alpha olefinic oil, containing alpha olefins having from 18 to 30 carbon atoms, and having a density of 0.79 gm/cc. Approximately 90% of the pore volume of the non-oil impregnated composition was filled with the alpha olefinic oil. The alpha olefinic oil, having a temperature in the range of from 100 to 110° C., was impregnated into the non-oil impregnated composition, which had been pre-heated to about 85° C., to provide the hydrocarbon oil-impregnated composition.

EXAMPLE 2

This example describes the procedure used to treat the hydrocarbon oil-impregnated and the non-oil impregnated compositions of Example 1, and it presents performance results from their use in the hydrodesulfurization of a diesel feedstock.

Trickle flow micro-reactors were used to test the hydrodesulfurization activity of the hydrocarbon oil-impregnated and non-oil impregnated compositions described in Example 1. A 50 cc volume, based on compacted bulk density of whole pellets, of each composition was used in the testing. The reactors were packed with extrudates of each composition, which were diluted with 80-60 mesh SiC in the volumetric composition-to-diluent ratio of 1:2.8. The compositions were conditioned and sulfided using a delayed-feed introduction procedure whereby the composition was first heated up and conditioned by contacting it with pure hydrogen at the operating pressure and at a temperature in the range of from 149° C. (300° F.) to 204° C. (400° F.) for a time period of about 12 hours. Following this hydrogen treatment, the composition was sulfided using a liquid hydrocarbon containing DMDS to provide a sulfur content of 2.5%.

The activity of the compositions were tested by charging the reactor with a blended feedstock of a diesel boiling range having the distillation properties (per ASTM test D-2287) that are presented in Table 1. The feedstock had a sulfur content of 1.8 wt. %, and it was charged to the reactor, which was operated at a pressure of 1075 psig, at a rate so as to provide a liquid hourly space velocity (LHSV) of 0.86 $hr^{-1}$. The hydrogen gas rate charged to the reactor was 4,500 scf $H^2$/bbl. The weight average bed temperature (WABT) was adjusted to provide a treated product having a sulfur content that was 10 ppmw.

FIG. 1 presents the results of the testing with plots of the WABT as a function of run length (in hours) for the non-oil impregnated composition and for the hydrocarbon oil-impregnated composition. It can be observed from these plots that the hydrocarbon oil-impregnated composition exhibits a significantly better hydrodesulfurization catalytic activity than does the non-oil impregnated composition by requiring a much lower temperature to achieve the specified sulfur reduction of the feedstock. The also show that the hydrocarbon oil-impregnated composition exhibits good catalytic stability over time.

TABLE 1

Distillation (D-2287) of Diesel Feedstock With 1.8 wt. % Sulfur

| % | ° F. |
|---|------|
| IBP | 268 |
| 5 | 384 |
| 10 | 425 |
| 20 | 473 |
| 30 | 493 |
| 40 | 519 |
| 50 | 542 |
| 60 | 564 |
| 70 | 585 |
| 80 | 609 |
| 90 | 641 |
| 95 | 663 |
| EP | 714 |

That which is claimed is:

1. A hydroprocessing catalyst composition, consisting essentially of: porous support material containing a metal component of a metal salt solution and hydrocarbon oil having an olefin content exceeding 30 wt % olefins having a carbon number in the range of from 14 to 38 carbons, wherein said support material containing said metal component of said metal salt solution and said hydrocarbon oil is uncalcined and non-sulfided prior to treatment with hydrogen, and wherein the pores of said support material are substantially filled with said olefin-containing hydrocarbon oil prior to treatment with hydrogen.

2. A composition as recited in claim 1, wherein said support material containing said metal component of said metal salt solution and said hydrocarbon oil is treated with hydrogen and further treated with a sulfur compound.

3. A composition as recited in claim 2, wherein said metal component includes a Group 9 and 10 metal component selected from the group consisting of cobalt and nickel, and wherein said Group 9 and 10 metal component is present in an amount in the range of from 0.5 wt. % to 20 wt. %.

4. A composition as recited in claim 3, wherein said metal component further includes a Group 6 metal component selected from the group consisting of molybdenum and tungsten, and wherein said Group 6 metal component is present in an amount in the range of from 5 wt. % to 50 wt. %.

5. A composition as recited in claim 4, wherein said support material containing said metal component of said metal salt solution and said hydrocarbon is dried so as to contain volatiles content not to exceed 20 wt. % LOI.

6. A composition as recited in claim 5, wherein said treatment with hydrogen is conducted at a hydrogen treatment temperature in the range upwardly to 250° C., in a gaseous atmosphere having a hydrogen partial pressure in the range of from 1 bar to 70 bar, and for a hydrogen treatment time period in the range of from 0.1 hours to 100 hours.

7. A composition as recited in claim 6, wherein said treatment with a sulfur compound is conducted by contacting said support material containing said metal component of said metal salt solution and said hydrocarbon oil that is further treated with hydrogen and with a sulfur-containing compound under contacting conditions that include a sulfiding temperature in the range of from 150° C. to 450° C. and a sulfiding pressure in the range of from 1 bar to 70 bar.

8. A composition as recited in claim 7, wherein the olefins in said hydrocarbon oil have a carbon number in the range of from 16 to 36 carbons.

9. A composition as recited in claim 8, wherein said hydrocarbon oil having an olefin content exceeding 30 wt % comprises alpha olefins having 18 to 30 carbon atoms per molecule.

10. A composition, consisting essentially of: a support material having pores that is loaded with an active metal precursor and hydrocarbon oil having an olefin content exceeding 30 wt % alpha olefins having 18 to 30 carbon atoms per molecule, wherein said hydrocarbon oil substantially fills the pores of said support material, and wherein said support material is thereafter treated with hydrogen but is uncalcined and non-sulfided prior to treatment with hydrogen.

11. A composition as recited in claim 10, wherein said support material treated with hydrogen is thereafter treated with a sulfur compound.

12. A composition as recited in claim 11, wherein said metal component of said active metal precursor includes a Group 9 and 10 metal component selected from the group consisting of cobalt and nickel, and wherein said Group 9 and 10 metal component is present in an amount in the range of from 0.5 wt. % to 20 wt. %.

13. A composition as recited in claim 12, wherein said metal component of said active metal precursor further includes a Group 6 metal component selected from the group consisting of molybdenum and tungsten, and wherein said Group 6 metal component is present in an amount in the range of from 5 wt. % to 50 wt. %.

14. A composition as recited in claim 13, wherein said support material containing said active metal precursor is dried so as to contain volatiles content not to exceed 20 wt. % LOI prior to adding said hydrocarbon oil.

15. A composition as recited in claim 14, wherein said treatment with hydrogen is conducted at a hydrogen treatment temperature in the range upwardly to 250° C., in a gaseous atmosphere having a hydrogen partial pressure in the range of from 1 bar to 70 bar, and for a hydrogen treatment time period in the range of from 0.1 hours to 100 hours.

16. A composition a recited in claim 15, wherein said treatment with a sulfur compound is conducted by contacting said support material treated with hydrogen with a sulfur-containing compound under contacting conditions that include a sulfiding temperature in the range of from 150° C. to 450° C. and a sulfiding pressure in the range of from 1 bar to 70 bar.

17. A composition as recited in claim 16, wherein said metal-incorporated support material is dried so as to contain a volatiles content in the range of from 3 to 15 wt. % LOI prior to adding said hydrocarbon oil.

18. A method of making a hydroprocessing catalyst composition, wherein said method comprises:
   incorporating a catalytically active metal-containing solution into a porous support material to provide a catalytically active metal-incorporated support material; and incorporating hydrocarbon oil having an olefin content exceeding 30 wt % olefins having a carbon number in the range of from 14 to 38 carbons into said metal-incorporated support material to provide an oil-impregnated composition consisting essentially of a metal-incorporated, hydrocarbon oil impregnated support material, wherein said metal-incorporated, hydrocarbon oil impregnated support material is uncalcined and non-sulfided prior to its loading into a reactor and prior to treatment with hydrogen, and wherein the pores of said support material are substantially filled with said olefin-containing hydrocarbon oil prior to treatment with hydrogen.

19. A method as recited in claim 18, further comprising:
   contacting said oil-impregnated composition under suitable hydrogen treatment conditions with hydrogen to thereby provide a hydrogen-treated composition.

20. A method as recited in claim 19, further comprising;
   contacting said hydrogen-treated composition under suitable sulfur treatment conditions with a sulfur compound to thereby provide a sulfided composition.

21. A method as recited in claim 20, wherein prior to said incorporating said hydrocarbon oil into said metal-incorporated support material, said metal-incorporated support material is dried so as to contain a volatiles content in the range of from 3 to 20 wt. % LOI.

22. A method as recited in claim 21, wherein said metal-incorporated support material is dried so as to contain a volatiles content in the range of from 3 to 15 wt. % LOI.

23. A method as recited in claim 22, wherein said hydrocarbon oil having an olefin content exceeding 30 wt % comprises alpha olefins having 18 to 30 carbon atoms per molecule.

24. A method as recited in claim 18, wherein the hydrocarbon oil has an olefin content exceeding 30 wt % olefins having a carbon number in the range 16 to 36 carbons.

25. A composition made by any one of the methods of claims 18 through 21 and claim 24.

26. A process, comprising: contacting under hydrodesulfurization process conditions a hydrocarbon feedstock with any one of the composition of claims 1-2, 3-17 and 25.

* * * * *